(12) United States Patent
Hayashi et al.

(10) Patent No.: US 12,331,250 B2
(45) Date of Patent: Jun. 17, 2025

(54) BIOMASS SOLID FUEL MANUFACTURING DEVICE

(71) Applicant: Mitsubishi UBE Cement Corporation, Tokyo (JP)

(72) Inventors: Shigeya Hayashi, Tokyo (JP); Yuusuke Hiraiwa, Tokyo (JP); Nobuyuki Ooi, Tokyo (JP)

(73) Assignee: Mitsubishi UBE Cement Corporation, Tokyo (JP)

( * ) Notice: Subject to any disclaimer, the term of this patent is extended or adjusted under 35 U.S.C. 154(b) by 181 days.

(21) Appl. No.: 18/251,478

(22) PCT Filed: Oct. 7, 2021

(86) PCT No.: PCT/JP2021/037171
§ 371 (c)(1),
(2) Date: May 2, 2023

(87) PCT Pub. No.: WO2022/102296
PCT Pub. Date: May 19, 2022

(65) Prior Publication Data

US 2024/0002730 A1 Jan. 4, 2024

(30) Foreign Application Priority Data

Nov. 10, 2020 (JP) ................. 2020-187102

(51) Int. Cl.
*C10B 47/30* (2006.01)
*C10B 53/02* (2006.01)
(Continued)

(52) U.S. Cl.
CPC .............. *C10B 47/30* (2013.01); *C10B 53/02* (2013.01); *F27B 7/08* (2013.01); *F27B 7/36* (2013.01)

(58) Field of Classification Search
CPC . C10B 47/30; C10B 53/02; F27B 7/08; F27B 7/36
See application file for complete search history.

(56) References Cited

U.S. PATENT DOCUMENTS

| 3,709,474 A * | 1/1973 | Kamstrup-Larsen ..... F27B 7/04 432/106 |
| 6,221,329 B1 * | 4/2001 | Faulkner ................... B07B 4/06 423/449.1 |

(Continued)

FOREIGN PATENT DOCUMENTS

| JP | 2002-003855 A | 1/2002 |
| JP | 2006-258328 A | 9/2006 |

(Continued)

OTHER PUBLICATIONS

Notification of Transmittal of Translation of the International Preliminary Report on Patentability and Translation of Written Opinion of the International Searching Authority; PCT/JP2021/037171; mailed on May 25, 2023.

(Continued)

*Primary Examiner* — Jonathan Miller
(74) *Attorney, Agent, or Firm* — Studebaker Brackett PLLC

(57) ABSTRACT

A biomass solid fuel manufacturing device (100) includes: a rotary kiln (2) that carbonizes a biomass molded body molded from raw material biomass. The rotary kiln (2) includes a kiln body (20), a raw material supply unit (30) that supplies the biomass molded body to an upstream end portion of the kiln body (20), and an inert gas supply unit (50) that supplies inert gas to an upstream end portion inside the kiln body (20).

4 Claims, 6 Drawing Sheets

(51) Int. Cl.
*F27B 7/08* (2006.01)
*F27B 7/36* (2006.01)

(56) References Cited

U.S. PATENT DOCUMENTS

| | | | | |
|---|---|---|---|---|
| 8,394,240 B2* | 3/2013 | Rinker | .................... | C10G 1/02 |
| | | | | 201/31 |
| 8,529,251 B2* | 9/2013 | Kumagai | .................. | F27B 7/22 |
| | | | | 432/112 |
| 10,421,911 B2* | 9/2019 | Ullom | .................... | C10B 47/30 |
| 11,198,829 B2* | 12/2021 | Hiraiwa | ................. | C10B 41/00 |
| 11,667,863 B2* | 6/2023 | Hiraiwa | ................. | C10B 53/08 |
| | | | | 44/590 |
| 2008/0210538 A1* | 9/2008 | Clark | .................... | C10B 47/30 |
| | | | | 432/115 |
| 2011/0011719 A1* | 1/2011 | Rinker | .................... | C10G 1/00 |
| | | | | 201/3 |
| 2016/0024390 A1* | 1/2016 | Ullom | .................... | C10G 1/086 |
| | | | | 202/99 |
| 2020/0239800 A1* | 7/2020 | Hiraiwa | ................. | C10L 5/442 |

FOREIGN PATENT DOCUMENTS

| | | | |
|---|---|---|---|
| JP | 2012-098015 A | 5/2012 |
| JP | 2014-214236 A | 11/2014 |
| JP | 2020-033396 A | 3/2020 |
| WO | 2016/143433 A1 | 9/2016 |

OTHER PUBLICATIONS

International Search Report issued in PCT/JP2021/037171; mailed Nov. 30, 2021.

\* cited by examiner (a)

(b)

BIOMASS SOLID FUEL MANUFACTURING DEVICE

CROSS-REFERENCE TO RELATED APPLICATIONS

This application is a 35 U.S.C. § 371 national phase application of PCT/JP2021/037171, filed on Oct. 7, 2021, which claims priority to Japanese Patent Application No. 2020-187102, filed on Nov. 10, 2020.

TECHNICAL FIELD

The present disclosure relates to a biomass solid fuel manufacturing device.

BACKGROUND ART

Patent Literature 1 discloses a configuration in which in a waste pyrolysis gasification device, purging is performed by introducing inert gas into the inside of a feeding machine for supplying waste to a rotary kiln furnace.

CITATION LIST

Patent Literature

Patent Literature 1: Japanese Unexamined Patent Publication No. 2012-098015

SUMMARY OF INVENTION

Technical Problem

When biomass solid fuel is manufactured by heating a biomass molded body using the device described in Patent Literature 1, there is a possibility that the molding of biomass is collapsed by steam or the like generated from the biomass and the biomass adheres to the inside of the furnace. The present disclosure is conceived in view of the foregoing circumstances, and an object of the present disclosure is to provide a biomass solid fuel manufacturing device capable of suppressing the collapse of a biomass molded body during manufacturing.

Solution to Problem

In order to achieve the foregoing object, according to one aspect of the present disclosure, there is provided a biomass solid fuel manufacturing device including a rotary kiln that carbonizes a biomass molded body molded from raw material biomass. The rotary kiln includes a kiln body, a raw material supply unit that supplies the biomass molded body to an upstream end portion of the kiln body, and an inert gas supply unit that supplies inert gas to an upstream end portion inside the kiln body.

According to the biomass solid fuel manufacturing device, the inert gas is supplied to the upstream end portion inside the kiln body to which the biomass molded body before being heated and with a high moisture percentage is input. For this reason, in the vicinity of the upstream end portion, the collapse of the biomass molded body caused by the condensation of steam generated from the biomass molded body can be suppressed.

The inert gas supply unit may discharge the inert gas in a radial direction inside the kiln body.

By implementing this configuration, the inert gas can also be supplied to a corner of the upstream end portion inside the kiln body in which the steam generated from the biomass molded body is likely to stay. Therefore, the collapse of the biomass molded body caused by the condensation of steam can be further suppressed.

The rotary kiln may be an external heating type, and the upstream end portion of the kiln body may be a non-heating zone in which a heating unit is not provided on an outer periphery of the kiln body.

As described above, when the upstream end portion is a non-heating zone, steam in this portion is more likely to condense. On the other hand, by supplying the inert gas to the upstream end portion, condensation caused by the staying of steam can be properly suppressed.

The inert gas supply unit may also discharge the inert gas into the raw material supply unit.

Since the condensation of steam entering the raw material supply unit connected to the rotary kiln is also prevented by implementing the above described configuration, the collapse of the biomass molded body inside the supply unit is also suppressed.

Advantageous Effects of Invention

According to the present disclosure, the biomass solid fuel manufacturing device capable of suppressing the collapse of the biomass molded body during manufacturing is provided.

DESCRIPTION OF EMBODIMENTS

Hereinafter, an embodiment for implementing the present disclosure will be described in detail with reference to the accompanying drawings. Incidentally, in the description of the drawings, the same reference signs are assigned to the same elements, and duplicated descriptions will be omitted.

Figure 1:
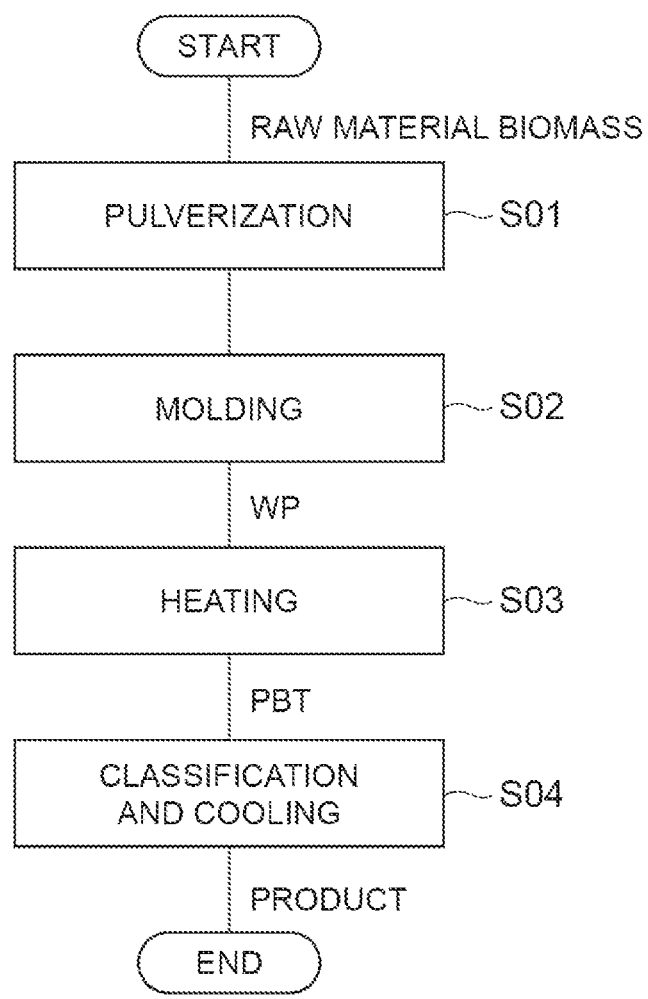
FIG. 1 is a flowchart describing an outline of a biomass solid fuel manufacturing method according to one aspect of the present disclosure.

FIG. 1 is a flowchart describing an outline of a biomass solid fuel manufacturing method according to one aspect of the present disclosure. As shown in FIG. 1, biomass which is a raw material for the biomass solid fuel is formed into a pellet-shaped biomass molded body (white pellet: hereinafter, referred to as "WP") through a pulverization step (S01) and a molding step (S02). The WP is heated in a heating step (S03) to be carbonized and become the biomass solid fuel (pelletizing before torrefaction: hereinafter, referred to as "PBT"). The PBT becomes a product through a classification and cooling step (S04) as necessary.

The pulverization step (S01) is a step of crushing and then pulverizing the biomass which is a raw material (raw material biomass). The type of the biomass which is a raw material is not particularly limited, but can be selected from woody-based and vegetation-based biomasses. The tree species, parts, and the like of the biomass which is a raw material are not particularly limited, but for example, as one aspect, the raw material can contain at least one selected from a group consisting of rubber tree, acacia, Dipterocarpaceae tree species, *radiata* pine, and a mixture of larch, spruce, and birch. Larch, spruce, and birch may be used alone as raw material biomass, but a mixture of two or more of these, preferably three of these can be used. In addition, the raw material can contain at least one selected from a group consisting of a mixture of spruce, pine, and fir (may be a mixture of two or three).

In addition, as raw materials, tree species other than those described above may be included. In one aspect of the present invention, the content of one or more selected from a group consisting of rubber tree, acacia, Dipterocarpaceae tree species, *radiata* pine, and a mixture of larch, spruce, and birch relative to the total weight of the raw material biomass is preferably 50% by weight or more, more preferably 80% by weight or more, and may be 100% by weight.

Incidentally, as raw materials, Douglas fir, Western hemlock, Japanese cedar, Japanese cypress, European red pine, old almond tree, almond shell, walnut shell, sago palm, empty fruit bunch of palm oil processing residue (FIB), meranti, acacia xylem, acacia hark, *eucalyptus*, teak, spruce+birch, rubber, and the like may be used.

The particle size of the biomass after pulverization is not particularly limited, but can be approximately 100 μm to 3000 μm on average, preferably 400 μm to 1000 μm on average. Incidentally, a known measurement method may be used for a method for measuring the particle size of biomass powder.

The molding step (S02) is a step of molding the pulverized biomass into a lump shape using a known molding technique. The biomass molded body (WP) which is a lump-shaped biomass object after molding can be made into pellets or briquettes. The size of the WP can be changed as appropriate. Incidentally, in the molding step, no binding agent such as a binder is added, and the pulverized biomass can be molded through compression and pressurization.

The heating step (S03) is a step of obtaining the biomass solid fuel (PBT) having strength and water resistance while maintaining the shape of the molded body by heating (low-temperature carbonization) the biomass molded body (WP) at 150° C. to 400° C. The heating step is performed using a biomass solid fuel manufacturing device 100 to be described later.

Incidentally the heating temperature (heating temperature of the PBT inside a kiln body 20: also referred to as carbonization temperature) is determined as appropriate depending on the shapes and sizes of the biomass which is a raw material and of the lump-shaped object, and is lower than 300° C. The heating temperature is more preferably 200° C. or higher and lower than 300° C. The heating temperature is more preferably 230° C. or higher and lower than 300° C. Further, it is preferable if the heating temperature is 230° C. to 280° C. In addition, the heating time in the heating step is not particularly limited, but can be set to 0.2 hours to 3 hours.

The classification and cooling step (S04) is a step of performing classification and cooling in order to convert the PBT, which is obtained by the heating step, into a product. The classification and the cooling may be omitted, and only one step may be executed. The PBT classified and cooled as necessary becomes a solid fuel product.

It is preferable that the chemical oxygen demand (COD) of immersion water when the biomass solid fuel obtained after the heating step (S03) is immersed in the water is 3000 ppm or less. Here, the chemical oxygen demand (COD) of the immersion water when the biomass solid fuel is immersed in the water (also simply referred to as "COD") refers to a COD value Obtained by preparing a COD measurement immersion water sample in accordance with a "method for detecting a metal or the like contained in an industrial waste" under Announcement No. 13 (A) by Japan Environment Agency released in 1973, and by performing analysis in accordance with JIS K0102 (2016)-17.

In addition, the Hardgrove Grindability Index (HGI) of the biomass solid fuel obtained after the heating step is preferably 15 to 60 based on JIS M 8801, more preferably 20 to 60. In addition, the BET specific surface area of the biomass solid file is preferably 0.15 $m^2/g$ to 0.8 $m^2/g$, more preferably 0.15 $m^2/g$ to 0.7 $m^2/g$. In addition, the equilibrium moisture of the biomass solid fuel after being immersed in the water is preferably 15 wt % to 65 wt %, more preferably 15 wt % to wt %.

In addition, the biomass solid fuel obtained after the heating step has a fuel ratio (fixed carbon/volatile matter) of 0.2 to 0.8, a dry base high calorific value of 4800 kcal/kg to 7000 kcal/kg, a molar ratio of oxygen O to carbon C (O/C) of 0.1 to 0.7, and a molar ratio of hydrogen H to carbon C (HIC) of 0.8 to 1.3. By causing physical properties of the biomass solid fuel after the heating step to fall within these ranges, powdering can be reduced while reducing COD in wastewater during storage, and handleability during storage can be improved. Incidentally, the physical properties of the biomass solid fuel can be fallen within these ranges by adjusting, for example, the tree species of the biomass solid fuel used as a raw material, parts thereof the heating temperature in the heating step, and the like. Incidentally, the industrial analysis values, the elemental analysis values, and the high calorific value in this specification are based on M 8812, 8813, and 8814.

In addition, the biomass solid fuel obtained after the heating step has a maximum temperature reached of lower than 200° C. in a self-heating test. Incidentally, the self-heating test is a test specified in "United Nations: Recommendations on the Transport of Dangerous Goods: Manual of Test Methods and Determination Criteria: 5th Edition: Self-heating Test".

Figure 2:
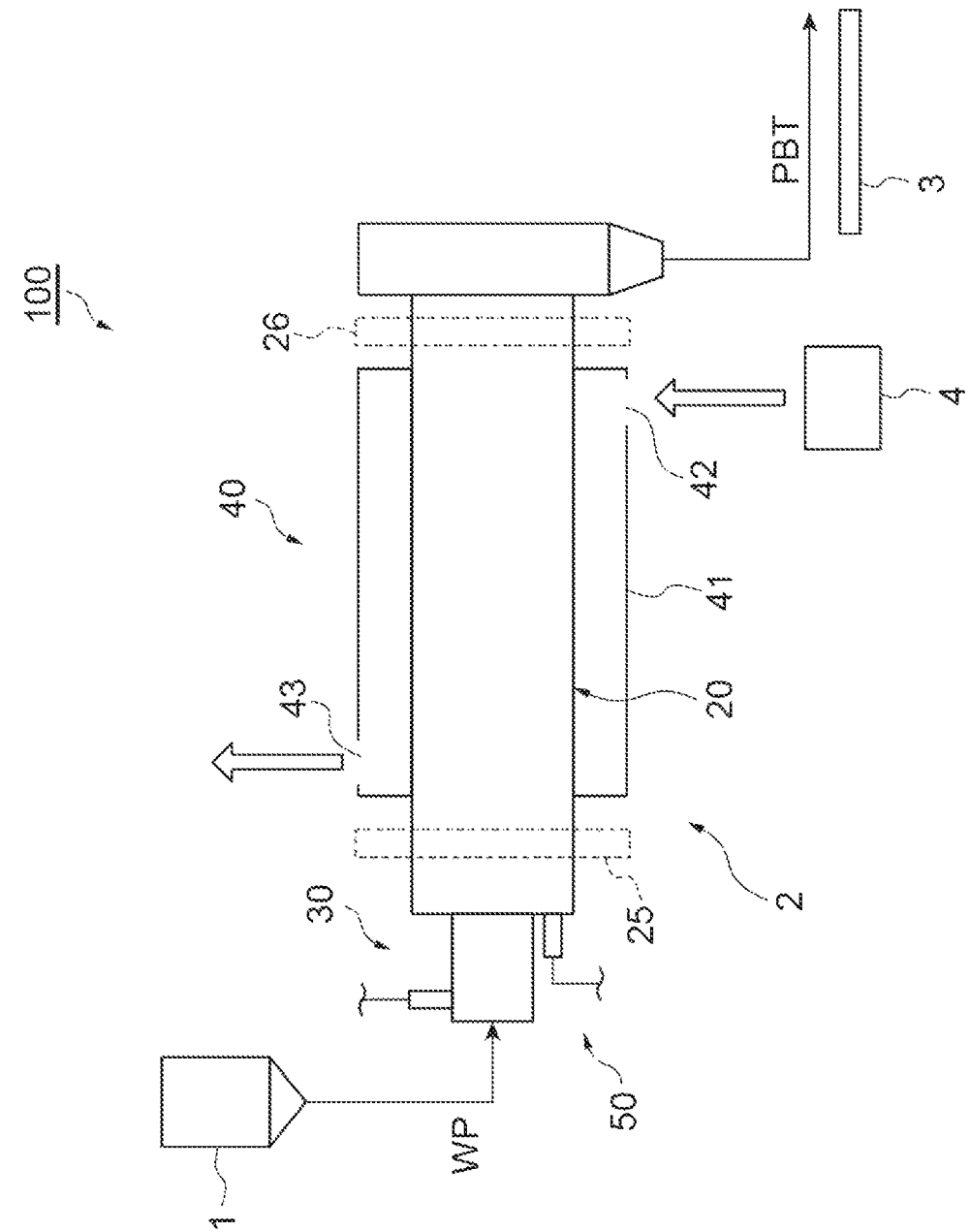
FIG. 2 is a schematic configuration view of a biomass solid fuel manufacturing device according to one aspect of the present disclosure.
Figure 3:
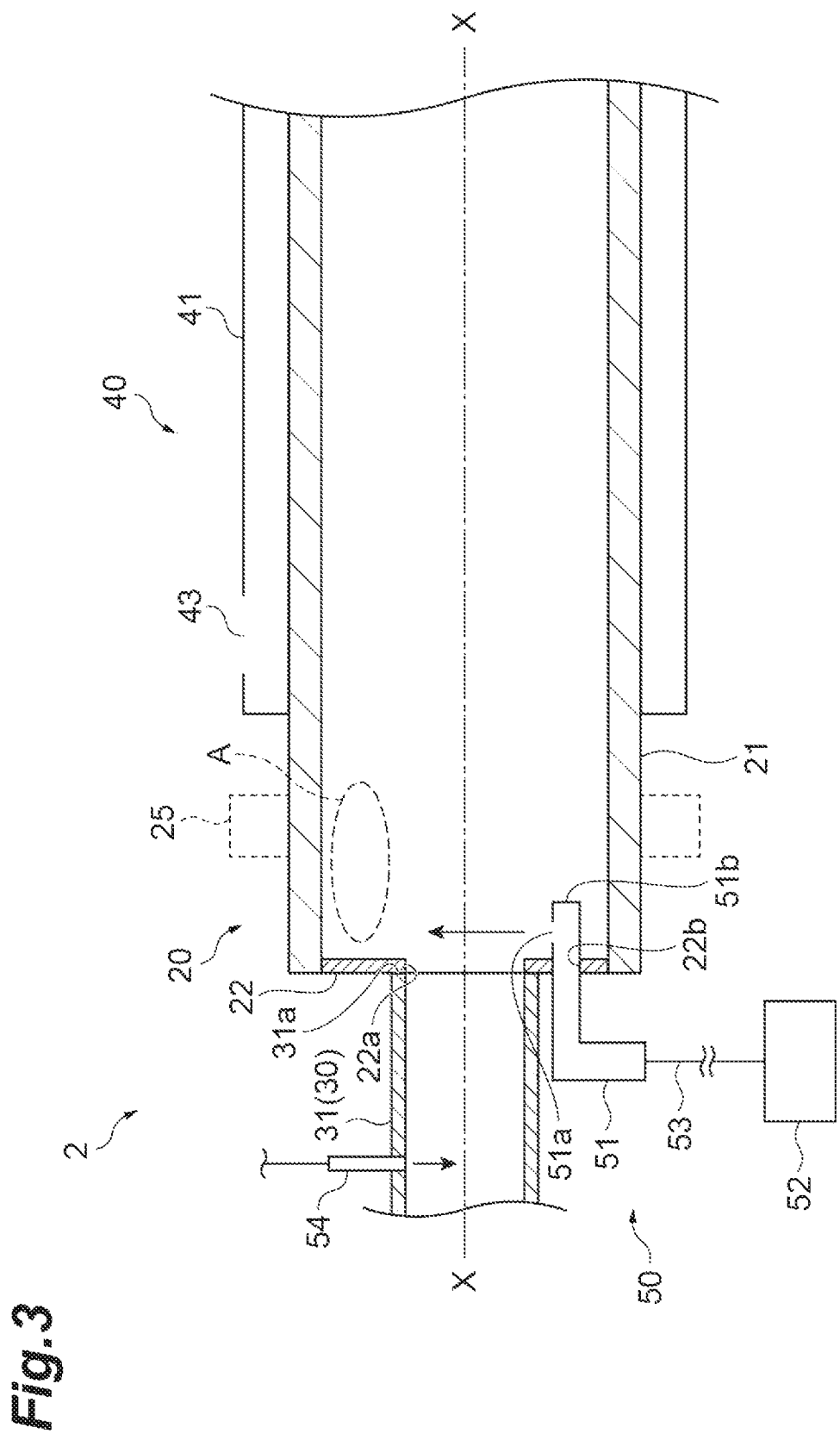
FIG. 3 is an enlarged view of a part of an upstream side of a rotary kiln.
Figure 4:
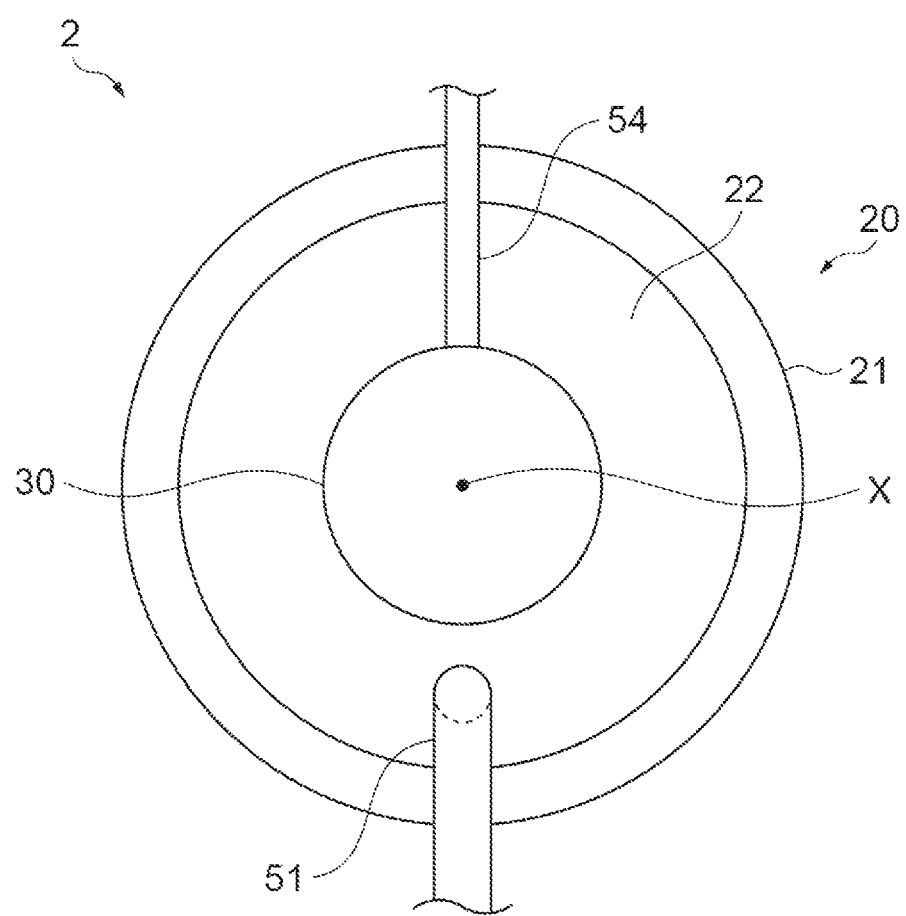
FIG. 4 is a schematic view of the upstream side of the rotary kiln as viewed in an axis direction.
Figure 5:
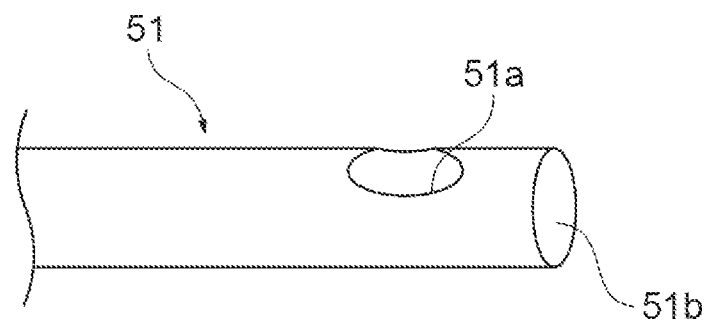
FIG. 5 is an enlarged view of a tip of a first nozzle.

Here, the biomass solid fuel manufacturing device 100 used in the heating step (S03) will be described with reference to FIGS. 2 to 5. FIG. 2 is a schematic configuration view describing the biomass solid fuel manufacturing device used in the heating step. In addition, FIG. 3 is an enlarged view of an upstream side of a rotary kiln, and FIG. 4 is a view of the kiln body and a raw material supply unit as viewed from the upstream side. Further, FIG. 5 is a view describing a tip shape of a first nozzle attached to the kiln body.

As shown in FIG. 2, the biomass solid fuel manufacturing device 100 includes a hopper 1 and a rotary kiln 2 (heating furnace). The hopper 1 and the rotary kiln 2 are controlled by a control unit (not shown).

The hopper 1 has the function of storing the biomass molded body (WP). The WP stored in the hopper 1 is supplied to the rotary kiln 2 in sequence, and is heated in the rotary kiln 2. The biomass solid fuel (PBT) is manufactured by heating the WP, The PBT manufactured by the rotary kiln 2 is conveyed by a conveyor 3.

The rotary kiln 2 is a so-called external heating type. The rotary kiln 2 includes the kiln body 20 which introduces the WP, which is an object to be heated, into the inside and in which the WP is heated (low-temperature carbonization); a raw material supply unit 30 connected to an upstream end portion of the kiln body 20; a heating unit that heats the kiln body 20; and an inert gas supply unit 50 that supplies inert gas into the inside of the kiln body 20.

The kiln body 20 has a substantially cylindrical shape, the biomass molded body (WP) which is an object to be heated is introduced from one side end portion into the inside, and the biomass solid fuel (PBT) after being heated (low-temperature carbonization) is discharged from the other side end portion. The kiln body 20 includes a tubular body 21 having a cylindrical shape, and a sealing plate 22 provided at an upstream end portion of the tubular body 21. The tubular body 21 is a cylindrical member extending from the upstream side (hopper 1 side) to a downstream side (conveyor 3 side). The tubular body 21 is supported by a roller 25 on the upstream side and a roller 26 on the downstream side so as to be rotatable around a central axis X (refer to FIGS. 3 and 4) of the tubular body 21, which extends in a movement direction of the WP, as a central axis. The central axis X of the tubular body 21 serves as a rotation axis of the kiln body 20.

The sealing plate 22 is a disk-shaped member connected to the upstream end portion of the tubular body 21. An opening 22a having a circular shape is provided at the center of the sealing plate 22. The raw material supply unit 30 is connected to an upstream side of the opening 22a. In addition, an opening 22b for a nozzle included in the inert gas supply unit 50 is provided in the sealing plate 22 at a position different from that of the opening 22a.

The raw material supply unit 30 has the function of supplying the object to be heated (WP), which is stored in the hopper 1, to the kiln body 20. The raw material supply unit 30 includes a supply pipe 31 having a tubular shape. For example, a screw feeder (not shown) that moves the object to be heated (WP) toward the kiln body 20 may be provided inside the supply pipe 31.

The heating unit 40 includes a hot gas path 41 on an outer periphery of the tubular body 21 of the kiln body 20, and a gas inlet 42 and a gas outlet 43 provided in the hot gas path 41. The hot gas path 41 is formed along an outer peripheral surface of the tubular body 21. In addition, the gas inlet 42 is provided, for example, on the downstream side along the kiln body 20 with respect to the hot gas path 41. In addition, the gas outlet 43 is provided, for example, on the upstream side along the kiln body 20 with respect to the hot gas path 41. The heating unit 40 supplies hot gas from an external heat source 4 through the gas inlet 42, and discharges the hot gas from the gas outlet 43 through the hot gas path 41, In the rotary kiln 2 shown in the present embodiment, since the hot gas path 41 is provided around the kiln body 20, the inside of the kiln body 20 is indirectly heated.

The temperature of the kiln body 20 of the rotary kiln 2 can be controlled by appropriately changing temperature at the gas inlet 42 of the hot gas path 41 through the controlling of the external heat source 4 via the control unit (not shown). Incidentally, the rotary kiln 2 shown in FIGS. 2 and 3 is a counterflow type in which the movement direction (direction from the hopper 1 side toward the conveyor 3 side) of the biomass molded body (WP) is opposite to a movement direction of the hot gas, but may be a parallel flow type. Incidentally, the oxygen concentration inside the rotary kiln 2 is set to be, for example, 10% or less.

The hot gas path 41 disposed on the outer periphery of the tubular body 21 of the kiln body 20 is provided at a position not overlapping the rollers 25 and 26, namely, between the rollers 25 and 26. For this reason, an upstream side of the hot gas path 41 (region interfering with the roller 25) and a downstream side of the hot gas path 41 (region interfering with the roller 26) become regions that are difficult for the hot gas to heat. These regions are so-called non-heating zones. In such a manner, in the kiln body 20, a region of which the periphery is covered by the hot gas path 41 becomes a heating zone, and the other regions become the non-heating zones.

The kiln body 20 is installed in an inclined state such that the upstream side (hopper 1 side) is located upward and the downstream side (conveyor 3 side) is located downward. The installation angle of the kiln body 20 can be changed as appropriate depending on the size of the kiln body 20, the moving speed of the WP inside the kiln body 20, and the like.

The inert gas supply unit 50 introduces the inert gas into the insides of the kiln body 20 and the raw material supply unit 30. Examples of the inert gas include $N_2$, $CO_2$, and the like. Alternatively, the inert gas may be air with an oxygen concentration of 10% or less or the like.

The inert gas supply unit 50 includes a first nozzle 51 that introduces the gas into the inside of the kiln body 20, a gas supply source 52 that supplies the inert gas to the first nozzle 51, a pipe 53 connecting the first nozzle 51 and the gas supply source 52, a second nozzle 54, and a gas supply source and a pipe (not shown) that supply the inert gas to the second nozzle 54. The inert gas may be supplied to the second nozzle 54 from the same gas supply source 52 as the first nozzle 51, or the inert gas may be supplied to the second nozzle 54 from the gas supply source different from the gas supply source 52. In addition, the pipes to the first nozzle 51 and the second nozzle 54 may be partially shared.

The first nozzle 51 has, for example, a cylindrical shape, and is attached to penetrate through the sealing plate 22 below the supply pipe 31 of the raw material supply unit 30. In addition, as shown in FIG. 5, an opening 51a may be provided in a side surface in the vicinity of a tip (end portion on a side that is opposite to an inert gas supply unit 50 side and that is disposed inside the kiln body 20) of the first nozzle 51. Further, an end surface 51b at the tip of the first nozzle 51 may have a closed shape. In addition, as shown in FIG. 4, the first nozzle 51 is fixed to the sealing plate 22 such that the opening 51a inserted into the kiln body 20 faces upward.

The second nozzle 54 has, for example, a cylindrical shape, and may be inserted into the supply pipe 31 from above the supply pipe 31. The second nozzle 54 can be disposed, for example, at a location apart from a downstream end portion 31a (connection portion with the sealing plate 22) of the supply pipe 31 to such an extent that a gas backflow is not generated. In addition, the second nozzle 54 may have a shape in which the tip (end portion on a side disposed inside the supply pipe 31) is open.

When the inert gas is introduced from the first nozzle 51, the inert gas moves in a direction intersecting the central axis X (radial direction). Specifically, since the opening 51a of the first nozzle 51 faces upward, the inert gas is discharged from the first nozzle 51 toward an upper side inside the kiln body 20. The inert gas discharged from the first nozzle 51 is supplied to the vicinity of the upstream end portion (the vicinity of a region A shown in FIG. 3) inside the kiln body 20, and promotes the movement of gas staying in the vicinity of the region A.

In addition, when the inert gas is introduced from the second nozzle 54, the inert gas moves in a direction intersecting a central axis of the supply pipe 31 (radial direction).

Specifically, the inert gas is discharged from the second nozzle 54 toward a lower side of the supply pipe 31.

A configuration may be implemented in which the inert gas is constantly introduced from the first nozzle 51 and the second nozzle 54 of the inert gas supply unit 50 during operation of the rotary kiln 2, or a configuration may be implemented in which the inert gas is repeatedly introduced at predetermined intervals. In addition, the supply timings of the inert gas from the first nozzle 51 and the second nozzle 54 may be simultaneous, or the timing may be such that the inert gas is supplied from only one. In such a manner, the supply timing of the inert gas can be changed as appropriate. In addition, the gas supply amount from each of the first nozzle 51 and the second nozzle 54 can also be changed as appropriate. For example, the gas supply amount can be adjusted to such an extent that the internal biomass molded body (WP) is prevented from scattering by the supply of the inert gas from the first nozzle 51 and the second nozzle 54.

In the biomass solid fuel manufacturing device 100, a parallel gas flow in the same direction as the movement direction of the biomass molded body (WP), namely, from the upstream side toward the downstream side is formed inside the kiln body 20. The gas flow is formed by providing a discharge port (not shown), which discharges the gas moving inside the kiln body 20, on the downstream side on which the PBT manufactured by the rotary kiln 2 is discharged to the conveyor 3. Therefore, the inert gas supplied from the first nozzle 51 and the second nozzle 54 of the inert gas supply unit 50 moves to the downstream side in the same manner as the internal gas flow, and is discharged from the discharge port.

In such a manner, according to the biomass solid fuel manufacturing device 100 of the present embodiment, the inert gas supply unit 50 supplies the inert gas to an upstream end portion inside the kiln body 20 to which the biomass molded body before being heated and with a high moisture percentage is input, specifically, the vicinity of the region A. For this reason, in the vicinity of the upstream end portion, the collapse of the biomass molded body caused by the condensation of steam generated from the biomass molded body can be suppressed.

In the related art, it has been known that a biomass molded body is heated (low-temperature carbonization) in the rotary kiln 2 to manufacture biomass solid fuel. In the rotary kiln 2, the temperature of the upstream side tends to be lower than that of the downstream side. In such a state, when the biomass molded body before being heated is introduced into the kiln body 20, there is a possibility that steam generated from the biomass molded body is likely to condense in the upstream end portion and the steam induces the collapse of the biomass molded body.

Particularly, when steam (moisture) adheres to the biomass molded body before carbonization, there is a possibility that the biomass molded body collapses and is turned into powder due to its low water resistance. In this case, since the shape of the biomass solid fuel after carbonization is also collapsed, there is a possibility that the recovery rate of the biomass solid fuel having a predetermined shape decreases. In addition, since there is a possibility that the collapsed and powdered biomass molded body adheres to an inner peripheral surface, blades, or the like inside the kiln body 20, there is a possibility that the function of the rotary kiln 2 decreases.

On the other hand, as described above, by supplying the inert gas using the inert gas supply unit 50, steam can be moved. (purged) from the upstream end portion. Therefore, the collapse of the biomass molded body caused by the condensation of moisture in the vicinity of the upstream end portion can be suppressed.

Here, the inert gas supply unit 50 may be configured to discharge the inert gas in the radial direction inside the kiln body 20. In addition, the first nozzle 51 may be included as the configuration in which the inert gas is discharged in the radial direction. By implementing such a configuration, compared to when the inert gas is supplied in a direction along the central axis X inside the kiln body 20, the inert gas steam generated from the biomass molded body can also be supplied to a corner of the upstream end portion inside the kiln body 20 in which the steam generated from the biomass molded body is likely to stay and condense. Therefore, the collapse of the biomass molded body can be further effectively suppressed. In addition, by implementing the configuration in which the inert gas is discharged in the radial direction using the first nozzle 51, a discharge direction can be finely controlled.

Incidentally, inside the kiln body 20, steam is likely to stay and condense particularly at an upper corner of the upstream end portion. For this reason, as described in the embodiment, by implementing the structure in which the first nozzle 51 discharges the inert gas upward, steam can be effectively moved (purged) from the corner. However, when the first nozzle 51 is disposed to discharge the inert gas at least in the radial direction, the inert gas is discharged in a direction to interfere with the gas flow inside the kiln body 20 from the upstream side toward the downstream side described above, and the movement of the gas containing steam in the radial direction is promoted, Therefore, by implementing the configuration in which the inert gas is discharged at least in the radial direction, the movement of steam staying at the upper corner can be promoted, and the collapse of the biomass molded body caused by the condensation of steam can be further suppressed. Incidentally, even when a configuration is implemented in which the inert gas is discharged into the kiln body 20 in a central axis X direction, at least a change in the gas flow inside the kiln body 20 can be induced, so that the movement of steam can be promoted.

In addition, as described above, in the case where the rotary kiln 2 is an external heating type and the upstream end portion of the kiln body 20 is a non-heating zone, steam in this portion is more likely to condense. On the other hand, by supplying the inert gas to the upstream end portion, condensation caused by the staying of steam can be properly suppressed. As a structural feature of the external heating type rotary kiln 2, the roller 25 can be provided in the vicinity of the inlet as a mechanism for rotating a kiln. In this case, since it is difficult to dispose the heating unit on an outer peripheral portion around the roller 25, and the region inevitably becomes a non-heating zone, steam is likely to stay, which is a problem. On the other hand, as described above, by supplying the inert gas, the movement of steam in the non-heating zone can be promoted.

In addition, the inert gas supply unit 50 may also supply the inert gas into the raw material supply unit 30 using the second nozzle 54 and the like. When the inert gas is supplied to the upstream end portion of the kiln body 20, there is a possibility that some of steam moves from the kiln body 20 into the upstream raw material supply unit 30. On the other hand, as described above, by also supplying the inert gas into the raw material supply unit 30, the collapse of the biomass molded body inside the raw material supply unit 30 can also be suppressed.

Incidentally, the rotary kiln 2 can be configured such that the carbonization temperature in the heating zone in which the heating unit 40 is provided on an outer periphery of the kiln body 20 becomes lower than 300° C. In such a manner, when the carbonization temperature in the heating zone of the kiln body 20 of the rotary kiln 2 is lower than 300° C., the temperature rise in the non-heating zones adjacent to the heating zone is suppressed. For this reason, the condensation of steam generated during heating of the biomass molded body is relatively likely to occur. In a general biomass solid fuel manufacturing step, since heating is performed at a carbonization temperature of 500° C. or higher, the temperature of the non-heating zones around the heating zone also becomes relatively high, thereby resulting in an environment in which the condensation of steam is unlikely to occur. On the other hand, as in the biomass solid fuel manufacturing device 100 of the present embodiment, when the carbonization temperature is lower than 300° C., the temperature rise in the non-heating zones adjacent to the heating zone is reduced (for example, lower than approximately 100° C.). For this reason, the condensation of steam is likely to occur, thereby resulting in a situation where the collapse and powdering of the biomass molded body is likely to be promoted.

On the other hand, as described above, by supplying the inert gas to the upstream end portion using the inert gas supply unit 50, compared to a rotary kiln of the related art, the effect of suppressing the collapse and powdering of the biomass molded body becomes prominent, and the biomass solid fuel of which the collapse is suppressed during manufacturing can be more effectively manufactured.

However, the configuration described in the embodiment can be applied to a case where the carbonization temperature in the kiln body 20 is 300° C. or higher. In addition, by applying the configuration described in the embodiment to the case where the carbonization temperature in the kiln body 20 is 300° C. or higher, the effect of being able to manufacture the biomass solid fuel of which the collapse is suppressed during manufacturing can be obtained.

The embodiment of the present disclosure has been described above; however, the present disclosure is not limited to the embodiment, and various modifications can be performed.

For example, the configuration, disposition, and the like of each part of the biomass solid fuel manufacturing device 100 including the rotary kiln 2 can be changed as appropriate. For example, the shapes or dispositions of an input port for the biomass molded body, of the discharge port for the biomass solid fuel, and the like can be changed as appropriate.

Figure 6:
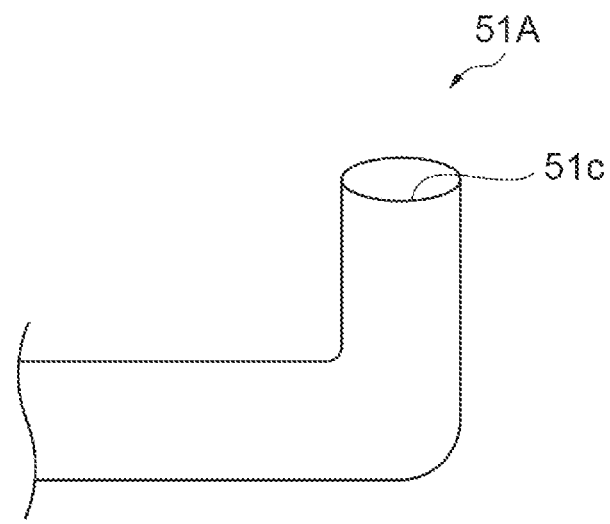
FIGS. 6(a) and 6(b) are views showing modification examples of the first nozzle.
Figure 6:
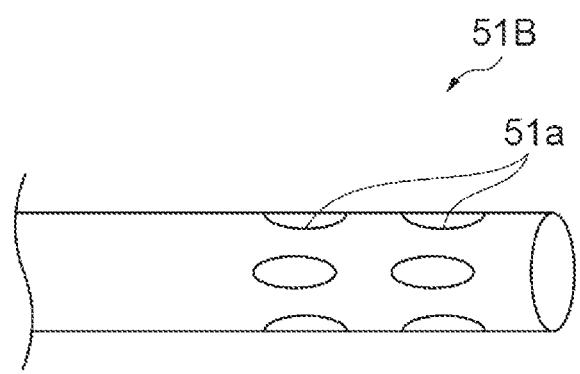

The dispositions, shapes, numbers, and the like of the first nozzle 51 and the second nozzle 54 can be changed as appropriate. For example, the shape of the first nozzle 51 capable of discharging the inert gas in the radial direction intersecting the central axis X can be changed as appropriate. For example, as in a first nozzle 51A shown in FIG. 6(a), the shape may be such that the nozzle itself is bent and an end portion 51c is open. In addition, for example, as in a first nozzle 51B shown in FIG. 6(b), the shape may be such that a plurality of the openings 51a are provided in the side surface. In addition, since the discharge direction of the inert gas is not limited to the radial direction, the shape of the first nozzle can also be changed as appropriate depending on the discharge direction. Further, the attachment position of the first nozzle 51 with respect to the sealing plate 22 can also be changed, and for example, a configuration may be implemented in which the opening 22b for attaching the first nozzle 51 is provided above the raw material supply unit 30. In addition, a configuration may be implemented in which a plurality of both the first nozzles 51 and the second nozzles 54 are disposed.

REFERENCE SIGNS LIST

1: hopper, 2: rotary kiln, 3: conveyor, 4: external heat source, 20: kiln body, 21: tubular body 22: sealing plate, 25, 26: roller, 30: raw material supply unit, 31: supply pipe, 40: heating unit, 41: hot gas path, 50: inert gas supply unit, 51, 51A, 51B: first nozzle, 52: gas supply source, 53: pipe, 54: second nozzle, 100: biomass solid fuel manufacturing device.

The invention claimed is:

1. A biomass solid fuel manufacturing device comprising:
    a rotary kiln that carbonizes a biomass molded body molded from raw material biomass,
    wherein the rotary kiln includes a kiln body, a supply pipe having a tubular shape configured to supply the biomass molded body to an upstream end portion of the kiln body, and an inert gas supply including a first nozzle and a second nozzle,
    wherein the first nozzle is configured to introduce inert gas to an upstream end portion inside the kiln body and configured to discharge the inert gas in a radial direction inside the kiln body, and
    wherein the second nozzle is configured to introduce the inert gas to the supply pipe and configured to discharge the inert gas in a radial direction inside the supply pipe.

2. The biomass solid fuel manufacturing device according to claim 1,
    wherein the rotary kiln is an external heating type, and the upstream end portion of the kiln body is a non-heating zone in which a heating unit is not provided on an outer periphery of the kiln body.

3. The biomass solid fuel manufacturing device according to claim 1,
    wherein a screw feeder moving the biomass molded body toward the kiln body is provided inside the supply pipe.

4. The biomass solid fuel manufacturing device according to claim 1,
    wherein the kiln body includes a tubular body, and a sealing plate provided at an upstream end portion of the tubular body, the sealing plate comprises an opening,
    wherein the supply pipe is connected to an upstream side of the opening, the opening is provided at a center of the sealing plate, and
    the first nozzle is attached to penetrate through the sealing plate below the supply pipe.

* * * * *